US012176591B2

(12) United States Patent
Bianchi

(10) Patent No.: US 12,176,591 B2
(45) Date of Patent: Dec. 24, 2024

(54) ELECTRICAL FILTER STRUCTURE

(71) Applicant: Advantest Corporation, Tokyo (JP)

(72) Inventor: Giovanni Bianchi, Ehningen (DE)

(73) Assignee: Advantest Corporation, Tokyo (JP)

( * ) Notice: Subject to any disclaimer, the term of this patent is extended or adjusted under 35 U.S.C. 154(b) by 215 days.

(21) Appl. No.: 17/721,939

(22) Filed: Apr. 15, 2022

(65) Prior Publication Data

US 2022/0238975 A1 Jul. 28, 2022

Related U.S. Application Data

(63) Continuation of application No. PCT/EP2020/053352, filed on Feb. 10, 2020.

(51) Int. Cl.
*H01P 1/203* (2006.01)
*H01P 1/201* (2006.01)
*H01P 7/08* (2006.01)

(52) U.S. Cl.
CPC ............ *H01P 1/2013* (2013.01); *H01P 1/203* (2013.01); *H01P 7/086* (2013.01)

(58) Field of Classification Search
CPC ........ H01P 1/203; H01P 1/2013; H01P 1/201; H01P 7/08; H01P 7/082; H01P 7/084; H01P 7/086; H03H 7/38
USPC .................................................. 333/204, 205
See application file for complete search history.

(56) References Cited

U.S. PATENT DOCUMENTS 4,489,292 A 12/1984 Ogawa
2002/0180382 A1 12/2002 Chatenet
2011/0102111 A1 5/2011 Wang

FOREIGN PATENT DOCUMENTS

CN 103956545 A 7/2014
JP H09 260902 A 10/1997

OTHER PUBLICATIONS

Yim et al, Novel Dual-Band Planar Resonator and Admittance Inverter For Filter Design and Applications, 2005 (Year: 2005).*

(Continued)

*Primary Examiner* — Stephen E. Jones

(57) ABSTRACT

An electrical filter structure for forwarding an electrical signal from a first port, e.g. P1, to a second port, e.g. P2, in a frequency selective manner, wherein the filter is a microwave filter, the electrical filter structure comprising: a plurality of pairs of an open stub and a short-circuited stub coupled electrically in parallel to a transmission line comprising a plurality of transmission line portions at a plurality of respective junctions between adjacent transmission line portions, e.g. Cross junction; and wherein the first port is connected with a first of the junctions having a first pair comprising a first open stub and a first short-circuited stub; wherein the second port is connected with a last of the junctions having a last pair comprising a last open stub and a last short-circuited stub; wherein lengths of the pair of the open stub and the short-circuited stub coupled to a same of the junctions are chosen such that electrical lengths of the open stub and short-circuited stub of the respective pairs are equal within a tolerance of +/−10%.

19 Claims, 8 Drawing Sheets

(56) References Cited

OTHER PUBLICATIONS

Matthaei G L .; Microwave Filters, Impedance-Matching Networks and Coupling Structures Passage Ed. Book, Jan. 1, 1980. 558 pp. Mountain View, CA. Jan. 1, 1980 (Jan. 1, 1980), p. 11, 360, XP002408547, ISBN: 978-0-89006-099-5 p. 375, line 10—p. 375, line 17; figures 7.03-5, 7.03-6.
Yim H-Y A et al; "novel dual-band planar resonator and admittance inverter for filter design and applications", 2005 IEEE MTT-S International Microwave Symposium, Piscataway, NJ, USA, IEEE, Jun. 12, 2005 (Jun. 12, 2005), pp. 2187-2190, XP010845003, DOI: 10. 1109/MWSYM.2005.1517184 ISBN: 978-0-7803-8846-8. Sections II. and III.; p. 2187-p. 2188; figures 4, 7,. 9-11.

* cited by examiner $$Z_{OPEN\_CKT\_STUB}(\omega) = -j \cdot Z_0 \cdot \cot\left(\frac{\pi}{4} \cdot \frac{\omega}{\omega_0}\right)$$

$$Z_{SHORT\_CKT\_STUB}(\omega) = j \cdot Z_0 \cdot \tan\left(\frac{\pi}{4} \cdot \frac{\omega}{\omega_0}\right)$$

$$Z_{OPEN\_CKT\_STUB}(\omega) \; // \; Z_{SHORT\_CKT\_STUB} =$$

$$\frac{-j \cdot Z_0 \cdot \cot\left(\frac{\pi}{4} \cdot \frac{\omega}{\omega_0}\right) j \cdot Z_0 \cdot \tan\left(\frac{\pi}{4} \cdot \frac{\omega}{\omega_0}\right)}{-j \cdot Z_0 \cdot \cot\left(\frac{\pi}{4} \cdot \frac{\omega}{\omega_0}\right) + j \cdot Z_0 \cdot \tan\left(\frac{\pi}{4} \cdot \frac{\omega}{\omega_0}\right)} = j \cdot Z_0 \cdot \frac{1}{\frac{\cos\left(\frac{\pi}{4} \cdot \frac{\omega}{\omega_0}\right)}{\sin\left(\frac{\pi}{4} \cdot \frac{\omega}{\omega_0}\right)} - \frac{\sin\left(\frac{\pi}{4} \cdot \frac{\omega}{\omega_0}\right)}{\cos\left(\frac{\pi}{4} \cdot \frac{\omega}{\omega_0}\right)}} = j \cdot Z_0 \cdot \frac{\sin\left(\frac{\pi}{4} \cdot \frac{\omega}{\omega_0}\right) \cdot \cos\left(\frac{\pi}{4} \cdot \frac{\omega}{\omega_0}\right)}{\left[\cos\left(\frac{\pi}{4} \cdot \frac{\omega}{\omega_0}\right)\right]^2 - \left[\sin\left(\frac{\pi}{4} \cdot \frac{\omega}{\omega_0}\right)\right]^2} =$$

$$= j \cdot Z_0 \cdot \frac{1}{2} \cdot \frac{\sin\left(2 \cdot \frac{\pi}{4} \cdot \frac{\omega}{\omega_0}\right)}{\cos\left(2 \cdot \frac{\pi}{4} \cdot \frac{\omega}{\omega_0}\right)}$$

$$Z_{OPEN\_CKT\_STUB}(\omega) \; // \; Z_{SHORT\_CKT\_STUB} = j \cdot \frac{Z_0}{2} \cdot \tan\left(\frac{\pi}{4} \cdot \frac{\omega}{\omega_0}\right)$$

Fig. 7

ELECTRICAL FILTER STRUCTURE

CROSS-REFERENCES TO RELATED APPLICATIONS

This application is a continuation of copending International Application No. PCT/EP2020/053352, filed Feb. 10, 2020, which is incorporated herein by reference in its entirety.

TECHNICAL FILED

Embodiments according to the invention are related to an electrical filter structure for forwarding an electrical signal from a first port to a second port in a frequency selective manner. Embodiments according to the invention are related to a microwave filter.

BACKGROUND OF THE INVENTION

Electrical filter structures are used in many applications. For example, electrical filter structures may be implemented to act as a low-pass filter, as a bandpass filter or as a high-pass filter. In the following, a brief introduction will be given to the design of filters.

FIG. 1 shows an example of a direct-coupled-stub-filter (hereinafter indicated as DCSF) according to a prior art. The DCSF is a classical microwave filter structure. The working principle and the design procedure of DSCF is briefly explained below.

As shown FIG. 1, the conventional DCSF consists of N (N is the order of the filter) short-circuited stubs (ST1, . . . STN) interleaved by N−1 transmission lines (TL1, . . . TLN−1). All the stubs and all the transmission lines have the same electrical length, i.e., a quarter of wavelength (λ/4) at the center frequency of the filter pass-band ($f_0$).

Normally, the filter is symmetrical, in that it is expressed as ST1=STN, ST2=STN=1, . . . and TL1=TLN−1, TL2=TLN−2, STk=STN+1−k TLk=TLN−k, k=1, 2, . . . floor(N/2). Such filters are particularly suitable for printed realization, for example, microstrip or stripline. In FIG. 1, a port 1 and a port 2 are the RF (radio frequency) ports of the filter, i.e., one (whatever) is the input port, the other is the output port.

As many distributed RF/microwave filters, the DCSF has a periodic frequency response, with an infinite number of pass-bands, centered at $f_0$, 3 $f_0$, . . . (2 h+1)*$f_0$ (h=0, 1, 2, . . . ). In each pass-band the frequency response is symmetrical around its respective center.

FIG. 2 shows sample response of the conventional DCSF. As shown in FIG. 2, a main bandpass is indicated with a dashed-line, and it is shown the first 3 pass-bands only, it can be mirrored around any of the axes x=(2 h+1)*$f_0$ without changing its shape. Normally, the filter is used in the "first window", i.e. for the frequency ranging from zero to slightly above 2 $f_0$ (the exact value depends on the accepted stop-band rejection). Regarding the conventional DCSF, following problems are known that it makes difficult to achieve an ideal response.

First, the stubs (ST1, . . . STN) and the transmission lines (TL1, . . . TLN−1) of the filter depicted in FIG. 1, which generates a response like the one shown as FIG. 2 are loss-free elements and are punctiformly joined. Second, true/physically realizable stubs and transmission lines present dissipation loss, which normally increases with the frequency. Consequently, the power transfer ratio is less (higher) than the ideal case in the pass-band (stop-band). Moreover, the pass-band additional attenuation increases with the frequency and passing from the center to the edge of the pass-band. Third, the junction between two transmission lines and on stub cannot be punctiform, rather it includes "connecting" elements (see FIG. 3), which behave as discontinuities, whose effect are more important as the frequency increases. The response becomes only approximately periodic, with increasing irregularities at higher h. Fourth, as the frequency increases, the cross dimensions of stubs and transmission lines become significant in comparison of the wavelength, i.e. the response at higher frequency becomes more and more irregular as well as less and less predictable.

FIG. 3 shows examples of realized conventional DCSF. FIG. 3(*a*) indicates a single stub structure and FIG. 3(*b*) indicates a double inner-stub structure. As indicated in FIG. 3, each stub is short circuited by having a ground connection GND which is connected typically via-hole. The filter structure of FIG. 3(*a*) indicates, for example, a stub ST1 is coupled to a first port P1 and a transmission line TL1 via T junction 10, a stub ST2 is coupled to the transmission line TL1 and a transmission line TL2 via T junction 10, . . . , and a stub ST7 is coupled to a transmission TL6 and a second port P2 via T junction 10. The filter structure of FIG. 3(*b*) indicates, for example, a stub ST1' is coupled to a first port P1 and a transmission line TL1' via a T junction 10, and a stub ST7' is coupled to a transmission line TL6' and a second port Ps via T junction 10. However, as indicated in FIG. 3(*b*), the DCSF has a double inner-stubs and therefore, other than the stubs ST1' and ST7', double-inner stubs are coupled to transmission lines via cross junction 20. For example, stubs ST2' are coupled to the transmission line TL1' and a transmission line TL2' via cross junction 20, and the stubs ST2' are located symmetrically centered at the transmission line.

For designing a filter as indicated in FIG. 3, there is an additional free design parameter "d", i.e., a length of the transmission line and a length of the stub. Playing with the additional design parameter d, it is possible to obtain all the stubs with very similar characteristic impedance (a first case) or such that the characteristic impedance of the outer stubs is about twice the ones of the inner stubs (similar to each other, a second case). In the first case, the most convenient realization is the one shown as FIG. 3(*a*). In the second case, it is better to realize the inner stubs with two stubs—with double characteristic impedance—in parallel, as shown in FIG. 3(*b*).

Usually, design model simulation of a filter differs from the real response of the filter. Especially, the difference at the low-pass side is relatively large. As indicated in FIG. 2, sharp low-pass side is required to realize ideal main pass band.

Accordingly, it is an object of the present invention to create a concept which facilitates the implementation of a desired filter characteristic using a readily available technology.

SUMMARY OF THE INVENTION

An embodiment according to the invention relates to an electrical filter structure for forwarding an electrical signal from a first port, e.g. P1 to a second port, e.g. P2 in a frequency selective manner. The filter is a microwave filter, the electrical filter structure comprising: a plurality of pairs of an open stub and a short-circuited stub coupled electrically in parallel to a transmission line comprising a plurality of transmission line portions at a plurality of respective junctions between adjacent transmission line portions, e.g.

Cross junction; and wherein the first port is connected with a first of the junctions having a first pair comprising a first open stub and a first short-circuited stub; wherein the second port is connected with a last of the junctions having a last pair comprising a last open stub and a last short-circuited stub; wherein lengths of the pair of the open stub and the short-circuited stub coupled to a same of the junctions are chosen such that electrical lengths of the open stub and short-circuited stub of the respective pairs are equal within a tolerance of +/−10%.

In a preferred embodiment, lengths of the transmission line portions are chosen such that electrical lengths of the transmission line portions are shorter, by at least 10 percent, than a fourth of a wavelength of a signal having a frequency of a passband center frequency of the electrical filter structure. Accordingly, it is possible to provide the filter structure which is consistently more selective in the low-pass side, i.e., having sharp low-pass side.

In a preferred embodiment, the lengths of the transmission line portions are chosen such that electrical lengths of the transmission line portions are shorter, between 15 to 50 percent, preferably between 20 to 40 percent, more preferably between 20 to 35 percent, than a fourth of a wavelength of a signal having a frequency of a passband center frequency of the electrical filter structure.

In a preferred embodiment, the microwave filter has a symmetrical structure, when the electrical filter structure comprises N short-circuited stubs having lengths, SST(s), with 1≤s≤N, N open stubs having lengths, OSTs, and N−1 transmission line portions having lengths, TLs, wherein the short-circuited stubs are configured to fulfil a formula (1), the open stubs are configured to fulfil a formula (2) and the transmission line are configured to fulfil a formula (3);

$$SST(k) = SST(N+1-k),\ [k \le \text{floor}(N/2)] \quad (1)$$

$$OST(k) = OST(N+1+k),\ [k \le \text{floor}(N/2)] \quad (2)$$

$$TL(k) = TL(N-k),\ [k \le \text{floor}(N/2)] \quad (3)$$

k=a positive integer.

In a preferred embodiment, the microwave filter is a Chebyshev filter having a pass-band ripple of 0.1 dB in a tolerance of +/−5 percent or +/−2 percent. The microwave filter is a band pass filter. The open stub and the short-circuited stub of a pair comprise the same characteristic impedance.

In a preferred embodiment, the electrical length of the open stub and short-circuited stub of the respective pairs is an eighth of a wavelength of a signal having a frequency of a passband center frequency of the electrical filter structure in tolerance of +/−2 to 5%. The short-circuited stubs comprise end capacitance configured to electrically short circuited at the design center frequency. Accordingly, this arrangement is possible to improve the electrical filter character.

BRIEF DESCRIPTION OF THE FIGURES

Embodiments according to the invention will subsequently be described taking reference to the enclosed figures in which:

FIG. 3(*b*) shows a schematic illustration of a double inner-stub structure of a possible printed realization of DCSF according to the prior art;

FIG. 4(*b*) shows a response of a realized filter according to the first embodiment of the present application further to the responses depicted in FIG. 4(*a*);

FIG. 6(*b*) shows a schematic illustration of possible structure for a DCSF according to the second embodiment of the present application;

FIG. 7 shows a proof of a circuit equivalence of the DCSF according to the second embodiment of the present application.

DETAILED DESCRIPTION OF THE EMBODIMENTS

Figure 1:
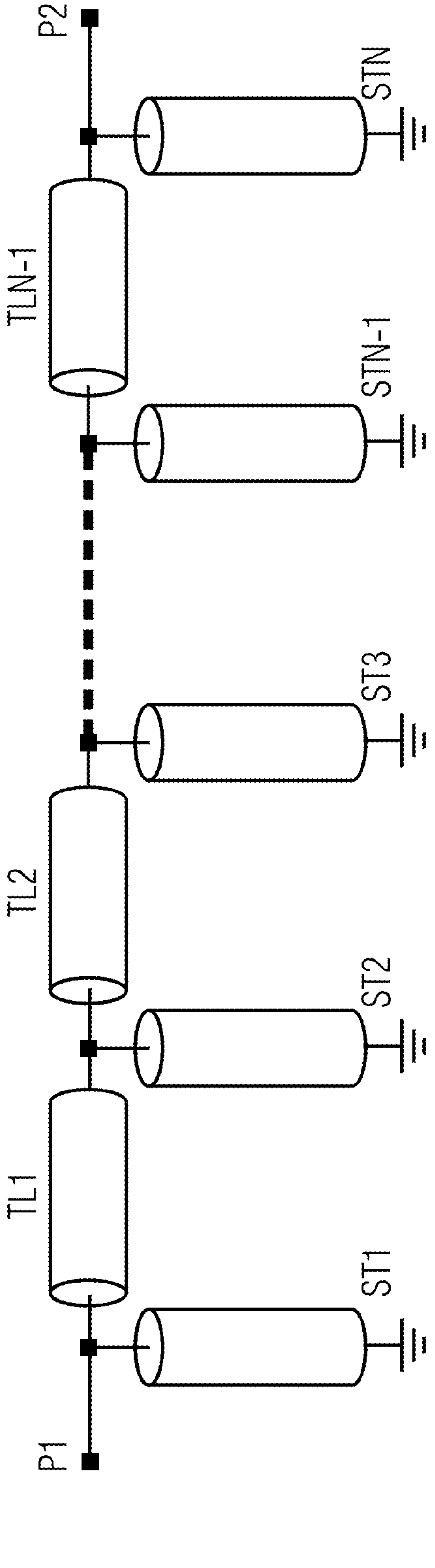
Fig. 1 (PRIOR ART)
FIG. 1 shows a schematic illustration of possible structures for a direct-coupled-stub filter, DCSF, according to the prior art.
Figure 2:
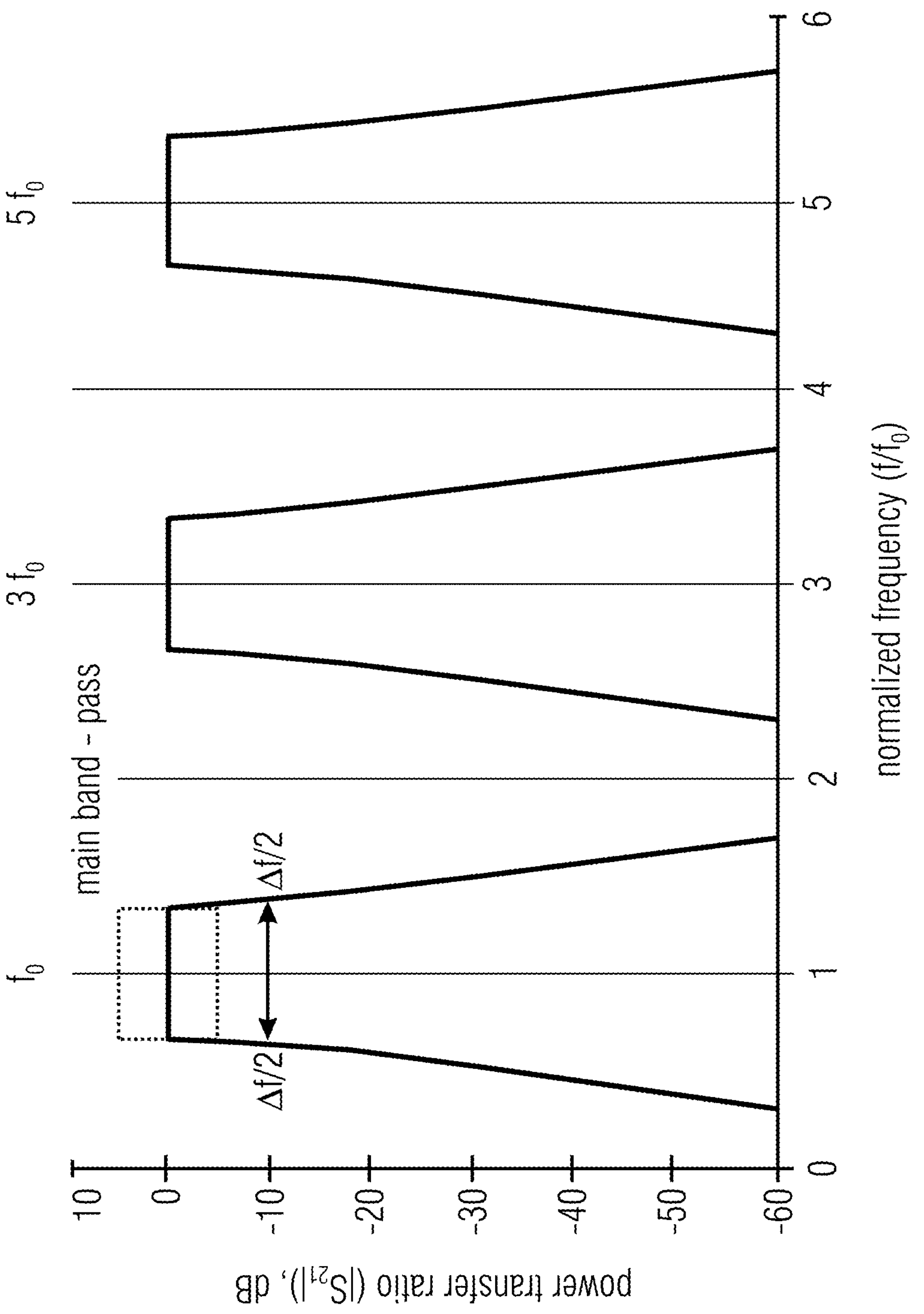
Fig. 2 (PRIOR ART)
FIG. 2 shows a schematic graph representing theoretical response of an ideal DCSF.
Figure 3A:
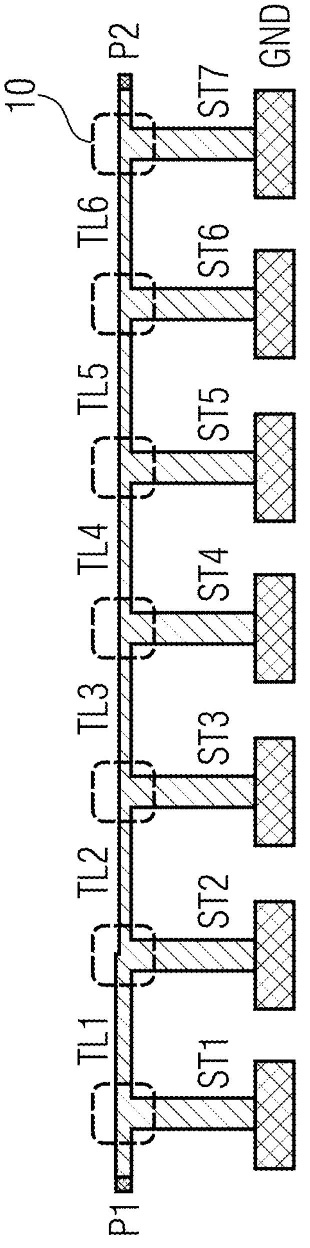
Fig. 3(a) (PRIOR ART)
FIG. 3(*a*) shows a schematic illustration of a single stub structure of a possible printed realization of DCSF according to the prior art.
Figure 3B:
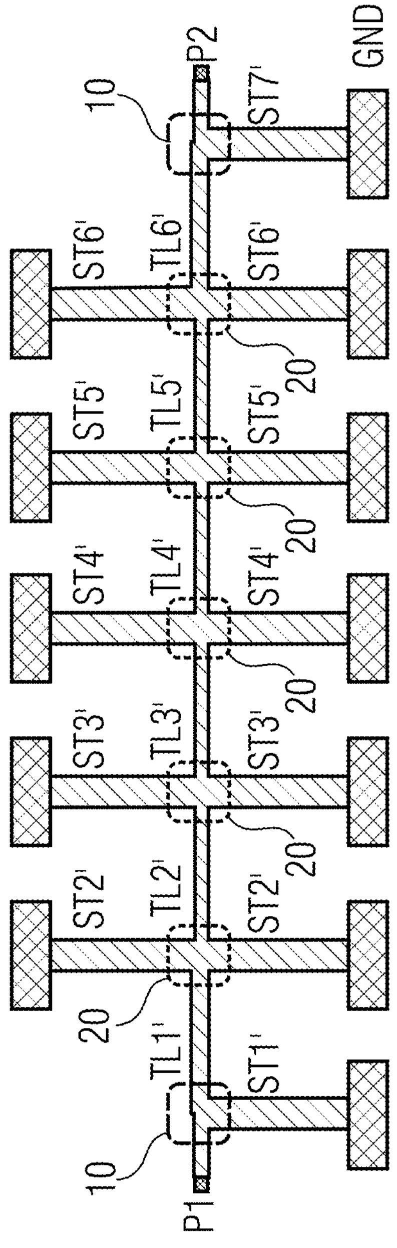
Fig. 3(b) (PRIOR ART)

An electrical filter structure according to a first embodiment of the present application, the filter structure of a direct-coupled-stub filter, DCSF, is topologically identical to a conventional DCSF. That is, the DCSF according to a first embodiment of the present application has topologically the same structure as indicated in FIG. 3(*a*) or (*b*). However, lengths of the transmission line portions are chosen such that electrical lengths of the transmission line portions are shorter, by at least 10 percent, than a fourth of a wavelength of a signal having a frequency of a passband center frequency of the electrical filter structure.

In addition, lengths of the stubs are chosen such that electrical lengths of the stubs are longer, by at least 2%, than a fourth of a wavelength of a signal having a frequency of a passband center frequency of the electrical filter structure.

Furthermore, as indicated in FIG. 3, the microwave filter has a symmetrical structure. The symmetrical structure is defined as:

when the electrical filter structure comprises N stubs having lengths, SST(s), with 1≤s≤N and N−1 transmission line portions having lengths, TLs, wherein the stubs are configured to fulfil a formula (1) within a tolerance of +/−5 percent or +/−2 percent, and the transmission line portions are configured to fulfil a formula (2) within a tolerance of +/−5 percent or +/−2 percent;

$$ST(k) = ST(N+1-k),\ [k \le \text{floor}(N/2)] \quad (1)$$

$$TL(k) = TL(N-k),\ [k \le \text{floor}(N/2)] \quad (2)$$

k=a positive integer.

Figure 4A:
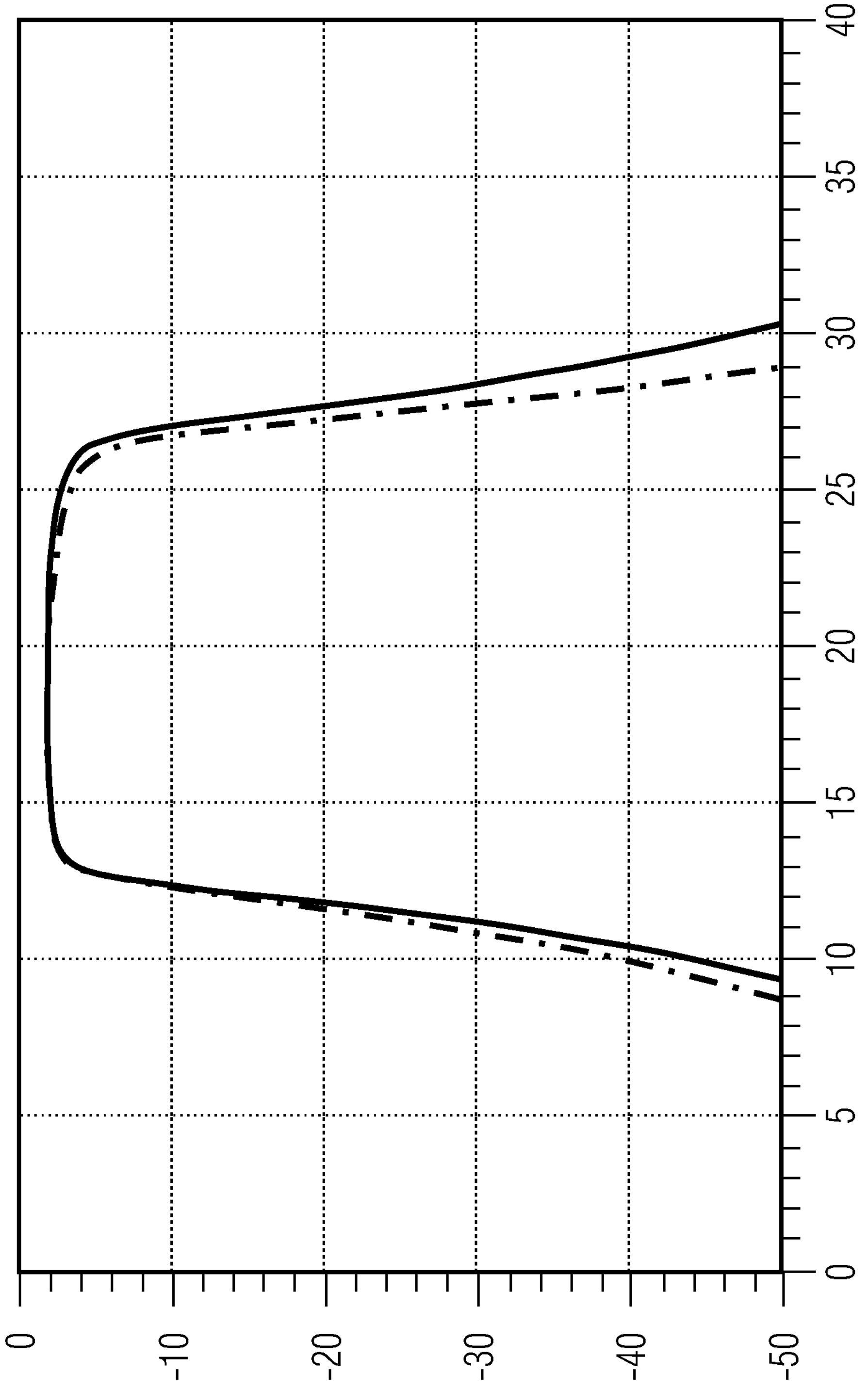
FIG. 4(*a*) shows a response of a designed, or simulated, DCSF according to a conventional structure and DCSF according to the first embodiment of the present application.
Figure 4B:
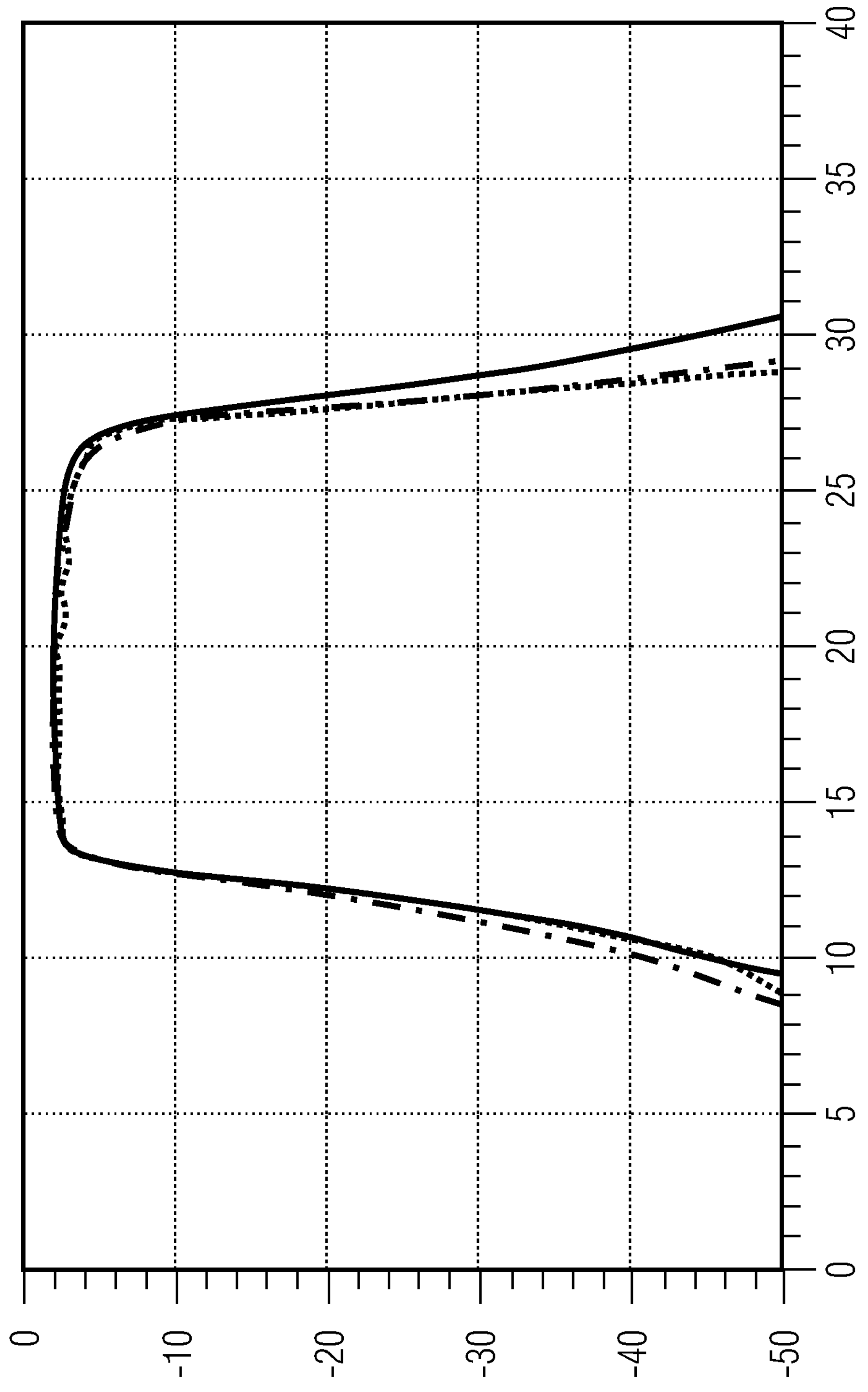

FIG. 4 shows schematic responses of a conventional DCSF and a DCSF according to a first embodiment of the present application. FIG. 4(*a*) shows a response of a designed, or simulated, DCSF according to a conventional structure and DCSF according to the first embodiment of the present application. FIG. 4(*b*) shows a response of a realized filter according to the first embodiment of the present application further to the responses depicted in FIG. 4(*a*). In FIG. 4, the response of the conventional DCSF is indicated as a long dashed line, the response of the DCSF according to the first embodiment of the present application is indicated as a dash-dot line and the measured result of the realized DCSF according to the first embodiment of the present application is indicated as a line.

The criterion for simulating/designing DCSF is:

DCSFs with N=9, pass-band 13 to 26 GHz.

Chebyshev design with pass-band ripple of 0.1 dB (in-band return-loss~16.4 dB).

Semi-ideal models for stubs and transmission lines (including loss).

x-axis: frequency in GHz.

y-axis: power transfer ratio ($|S_{21}|$) in dB

As indicated in FIG. 4(*a*), the response of the conventional DCSF has better selectivity at the high-pass side than the DCSF according to the first embodiment of the present application. At the low-pass side, the DCSF according to the first embodiment of the present application has a better selectivity.

According to FIG. 4(*b*), the measured response of the DCSF according to the first embodiment of the present application seems to be better than the response of the simulated DCSF according to the first embodiment of the present application. That is, as shown in FIG. 4(*b*), the high-pass selectivity of the measure response is almost the same as the conventional design, and the low-pass selectivity is almost the same of the simulated DCSF according to the first embodiment of the present application. Therefore, the DCSF according to the first embodiment is possible to provide better selectivity of the pass-band, i.e., improve the characteristic of the electrical filter by adjusting the length of the transmission line portions, and/or the length of the stubs.

Figure 5:
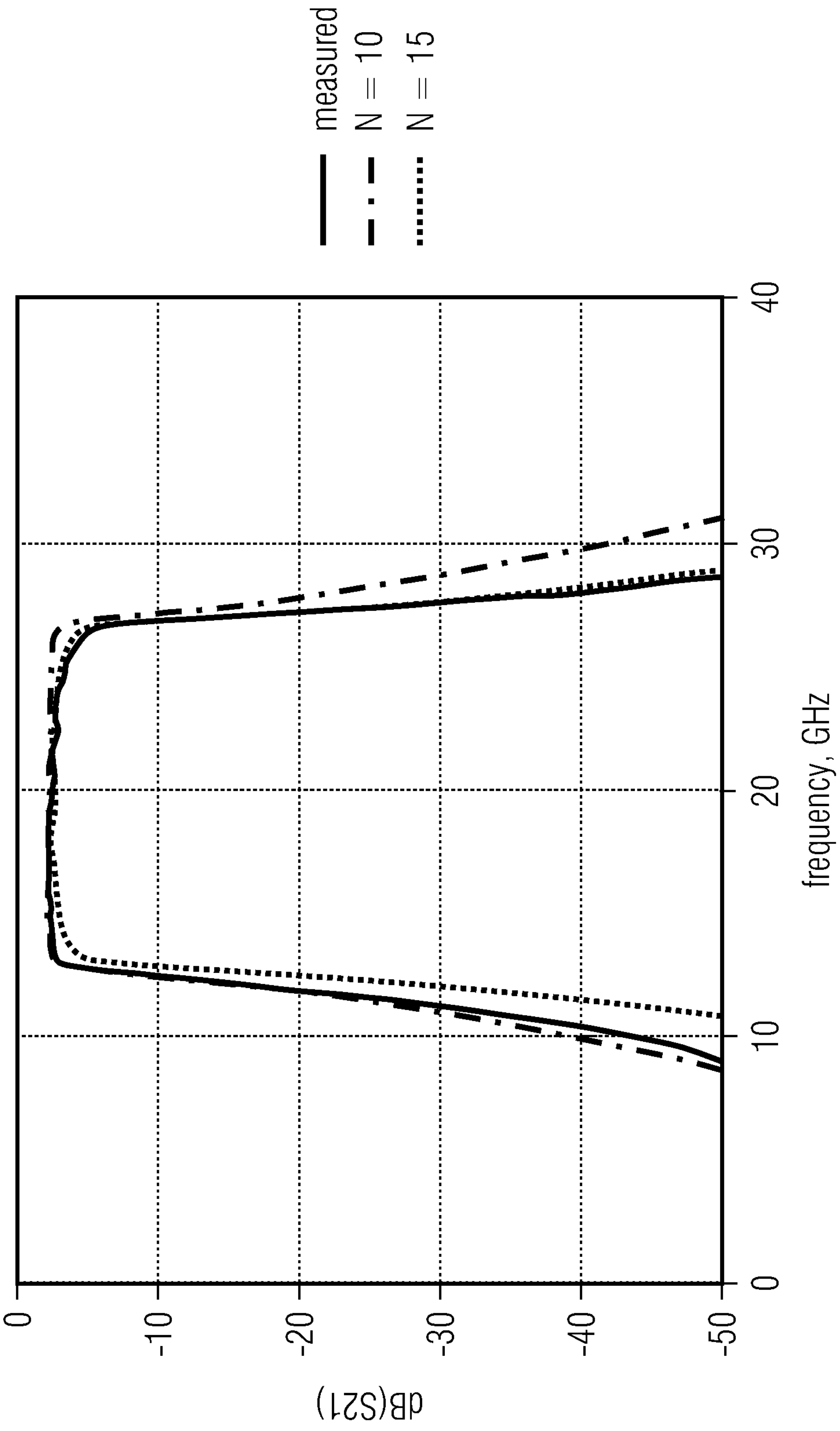
FIG. 5 shows schematic responses of conventional DCSFs according to the prior art and a measured result of the DCSF according to the first embodiment of the present application.

FIG. 5 shows responses of conventional DCSF, Chebyshev filters with different order, i.e., $15^{th}$ order filter and $10^{th}$ order filter. The response of the $15^{th}$ order is indicated as dot line and the response of the $10^{th}$ order is indicated as dot-dashed line in FIG. 5. In the conventional DCSFs, it is designed as pass-band ripple 0.2 dB, dissipation loss considered to simulate the response. The discrepancy with the response indicated in FIG. 4 on order and pass-band ripple are mainly due to the fact that the filter here considered is purely ideal (with losses) and canonical, while the DCSF is redundant: the transmission lines generate some additional selectivity.

As indicated in FIG. 5, the filter structure according to the first embodiment of the present invention shows an equivalent order of 15 in the low-pass side, with an improvement of 50% on the existing solution. That is, the filter structure according to the first embodiment of the present invention significantly improve filter characteristics without changing the topological structure of the filter.

As a modification, the lengths of the transmission line portions are chosen such that electrical lengths of the transmission line portions are shorter, between 15 to 50 percent, preferably between 20 to 40 percent, more preferably between 20 to 35 percent, than a fourth of a wavelength of a signal having a frequency of a passband center frequency of the electrical filter structure. In addition, the lengths of the stubs are chosen such that electrical lengths of the stubs are longer, between 2 to 5 percent, than a fourth of a wavelength of a signal having a frequency of a passband center frequency of the electrical filter structure.

Figure 6A:
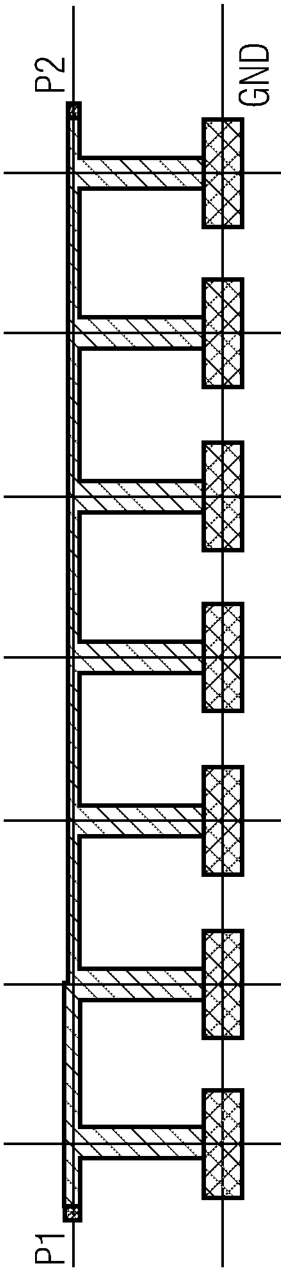
FIG. 6(*a*) shows a schematic illustration of possible structure for a DCSD according to the first embodiment of the present application.
Figure 6B:
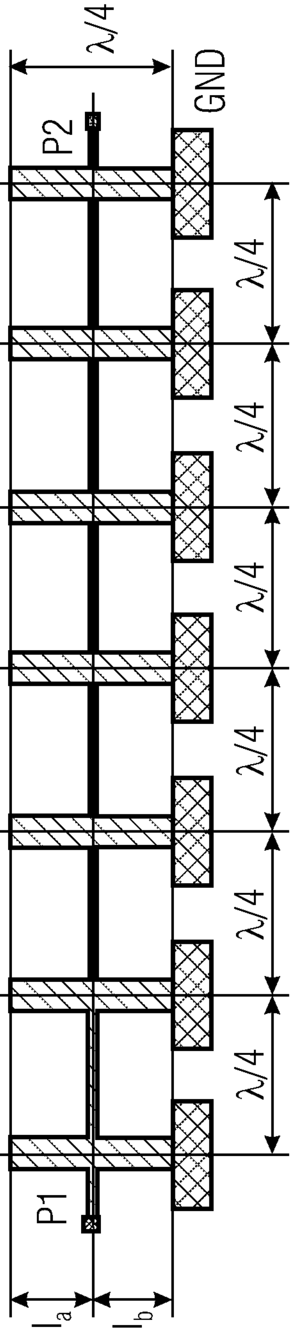

FIG. 6 shows a schematic possible structure for a DCSF according to the second embodiment of the present application. FIG. 6(*a*) shows a DCSD according to the first embodiment of the present application, and FIG. 6(*b*) shows a DCSF according to the second embodiment of the present application.

The DCSF structure as indicated in FIG. 6(*b*) is one more variation of the first embodiment as indicated in FIG. 6(*a*). The DCSF structure of FIG. 6(*b*) is based on a circuit equivalence, i.e., two stubs in parallel (one open-circuited and one short-circuited) with the same electrical length and characteristic impedance, are equivalent to one single short-circuited stub with double electrical length and half characteristic impedance as indicated in FIG. 6(*a*). The proof of the circuit equivalence is indicated in FIG. 7. In the ideal case it is $I_a=I_b=\lambda/8$, i.e., within tolerance of +/−10%, practically that identity is only approximately respected, due to non-ideality elements on physical short and open circuit.

Furthermore, lengths of the transmission line portions could be chosen such that electrical lengths of the transmission line portions are shorter, by at least 10 percent, than a fourth of a wavelength of a signal having a frequency of a passband center frequency of the electrical filter structure. In this case, the lengths of the transmission line portions are chosen such that electrical lengths of the transmission line portions are shorter, between 15 to 50 percent, preferably between 20 to 40 percent, more preferably between 20 to 35 percent, than a fourth of a wavelength of a signal having a frequency of a passband center frequency of the electrical filter structure.

As a modification, the microwave filter has a symmetrical structure, when the electrical filter structure comprises N short-circuited stubs having lengths, SST(s), with $1 \le s \le N$, N open stubs having lengths, OSTs, and N−1 transmission line portions having lengths, TLs, wherein the short-circuited stubs are configured to fulfil a formula (1), the open stubs are configured to fulfil a formula (2) and the transmission line are configured to fulfil a formula (3);

$$SST(k) = SST(N+1-k),\ [k \le \text{floor}(N/2)] \quad (1)$$

$$OST(k) = OST(N+1+k),\ [k \le \text{floor}(N/2)] \quad (2)$$

$$TL(k) = TL(N-k),\ [k \le \text{floor}(N/2)] \quad (3)$$

k=a positive integer.

As a further modification, the microwave filter is a Chebyshev filter having a pass-band ripple of 0.1 dB in a tolerance of +/−5 percent or +/−2 percent. In addition, the microwave filter is a band pass filter. Furthermore, the open stub and the short-circuited stub of a pair comprise the same characteristic impedance. In addition, the electrical length of the open stub and short-circuited stub of the respective pairs is an eighth of a wavelength of a signal having a frequency of a passband center frequency of the electrical filter structure in tolerance of +/−2 to 5%.

The invention claimed is:

1. A microwave filter structure for forwarding an electrical signal from a first port to a second port in a frequency selective manner, the microwave filter structure comprising:

a plurality of pairs of an open stub and a short-circuited stub coupled in parallel, wherein the plurality of pairs is coupled electrically to a transmission line, and wherein the transmission line comprises a plurality of transmission line portions and wherein the plurality of pairs couple to the plurality of transmission line portions at a plurality of junctions between adjacent transmission line portions; and wherein the first port is coupled with a first junction of the plurality of junctions that is coupled to a first pair comprising a first open stub and a first short-circuited stub;

wherein the second port is coupled with a last junction of the plurality of junctions that is coupled to a last pair comprising a last open stub and a last short-circuited stub; and wherein lengths of a pair of an open stub and a short-circuited stub coupled to a same one of the plurality of junctions are sized such that electrical lengths of the open stub and short-circuited stub of a respective pair are longer by at least 2% than a fourth of a wavelength of a signal having a frequency of a passband center frequency of the microwave filter structure and equal within a tolerance of +/−10%.

2. The microwave filter structure according to claim 1, wherein lengths of the plurality of transmission line portions are sized wherein electrical lengths of each of the plurality of transmission line portions are shorter, by at least 10 percent, than a fourth of a wavelength of a signal having a frequency of a passband center frequency of the microwave filter structure.

3. The microwave filter structure according to claim 1, wherein the lengths of the plurality of transmission line portions are sized wherein electrical lengths of each of the plurality of transmission line portions are shorter, between 15 to 50 percent than a fourth of a wavelength of a signal having a frequency of a passband center frequency of the microwave electrical filter structure.

4. The microwave filter structure according to claim 1, wherein the plurality of pairs and the plurality of junctions create a symmetrical structure, and wherein the plurality of pairs and the plurality of transmission line portions comprise:

N short-circuited stubs having lengths, SST(s);

with 1≤s≤N, N open stubs having lengths, OST(s); and

N−1 transmission line portions having lengths, TLs; and wherein the N short-circuited stubs are configured to fulfil a formula (1), the N open stubs are configured to fulfil a formula (2) and the N−1 transmission line are configured to fulfil a formula (3);

$$SST(k) = SST(N+1-k),\ [k \leq \text{floor}(N/2)] \quad (1)$$

$$OST(k) = OST(N+1+k),\ [k \leq \text{floor}(N/2)] \quad (2)$$

$$TL(k) = TL(N-k),\ [k \leq \text{floor}(N/2)] \quad (3)$$

k=a positive integer=1, 2, . . . floor (N/2), wherein N is the order of the filter.

5. The microwave filter structure according to claim 1, characterized as a Chebyshev filter having a pass-band ripple of 0.1 dB with a tolerance of +/−5 percent.

6. The microwave filter structure according to claim 1, characterized as a band pass filter.

7. The microwave filter structure according to claim 1, wherein an open stub and a short-circuited stub of a respective pair of the plurality of pairs comprise the same characteristic impedance.

8. The microwave filter structure according to claim 1, wherein an electrical length of an open stub and a short-circuited stub of a respective pair of the plurality of pairs is an eighth of a wavelength of a signal having a frequency of a passband center frequency of the electrical filter structure with tolerance of +/−2 to 5%.

9. The microwave filter structure according to claim 1, characterized as a Chebyshev filter having a pass-band ripple of 0.1 dB with a tolerance of +/−2 percent.

10. The apparatus according to claim 1, characterized as a Chebyshev filter having a pass-band ripple of 0.1 dB with a tolerance of +/−5 percent.

11. The apparatus according to claim 1, characterized as a band pass filter.

12. The apparatus according to claim 1, wherein an open stub and a short-circuited stub of a respective pair of the plurality of pairs comprise a same characteristic impedance.

13. An apparatus comprising:

an electrical filter operable to forward an electrical signal from a first port to a second port in a frequency selective manner, wherein the electrical filter is characterized as a microwave filter, and wherein the electrical filter further comprises:

a plurality of pairs of an open stub and a short-circuited stub coupled in parallel, wherein the plurality of pairs is coupled electrically to a transmission line, wherein the transmission line comprises a plurality of transmission line portions and wherein the plurality of pairs couple to the plurality of portions at a plurality of junctions between adjacent transmission line portions; and wherein the first port is coupled with a first junction of the plurality of junctions coupled to a first pair comprising a first open stub and a first short-circuited stub;

wherein the second port is coupled with a last junction of the plurality of junctions coupled to a last pair comprising a last open stub and a last short-circuited stub; and wherein lengths of a pair of an open stub and a short-circuited stub that are coupled to a same one of the plurality of junctions are sized wherein electrical lengths of the open stub and short-circuited stub of a respective pair are longer by at least 2% than a fourth of a wavelength of a signal having a frequency of a passband center frequency of the electrical filter.

14. The apparatus according to claim 13, wherein lengths of the plurality of transmission line portions are sized wherein electrical lengths of each of the plurality of transmission line portions are shorter, by at least 10 percent, than a fourth of a wavelength of a signal having a frequency of a passband center frequency of the electrical filter.

15. The apparatus according to claim 13, wherein the lengths of the transmission line portions are sized wherein electrical lengths of each of the plurality of transmission line portions are shorter, between 15 to 50 percent than a fourth of a wavelength of a signal having a frequency of a passband center frequency of the electrical filter structure.

16. An apparatus comprising:

an electrical filter for forwarding an electrical signal from a first port to a second port in a frequency selective manner, wherein the electrical filter comprises a microwave filter, and wherein the electrical filter further comprises:

a plurality of pairs of an open stub and a short-circuited stub coupled in parallel, wherein the plurality of pairs is coupled electrically to a transmission line, wherein the transmission line comprises a plurality of transmission line portions and wherein the plurality of pairs couple to the plurality of portions at a plurality of junctions between adjacent transmission line portions; and wherein the first port is connected with a first of the plurality of junctions coupled to a first pair comprising a first open stub and a first short-circuited stub;

wherein the second port is connected with a last of the plurality of junctions coupled to a last pair comprising a last open stub and a last short-circuited stub; and wherein lengths of the plurality of transmission line portions are sized wherein electrical lengths of each of the plurality of transmission line portions are shorter, by at least 10 percent, than a fourth of a wavelength of a signal having a frequency of a passband center frequency of the electrical filter; and wherein lengths of a pair of an open stub and a short-circuited stub that are coupled to a same one of the plurality of junctions are sized wherein electrical lengths of the open stub and short-circuited stub of a respective pair are longer by at least 2% than a fourth of a wavelength of a signal having a frequency of a passband center frequency of the electrical filter.

17. The apparatus according to claim 16, wherein lengths of a pair of an open stub and a short-circuited stub coupled to a same one of the plurality of junctions are sized wherein electrical lengths of the open stub and short-circuited stub of a respective pair are equal within a tolerance of +/−10%.

18. The apparatus according to claim 16, wherein lengths of the transmission line portions are sized wherein electrical lengths of each of the plurality of transmission line portions are shorter, between 15 to 50 percent than a fourth of a wavelength of a signal having a frequency of a passband center frequency of the electrical filter structure.

19. The apparatus according to claim 16, wherein the microwave filter is a Chebyshev filter having a pass-band ripple of 0.1 dB with a tolerance of +/−5 percent.

* * * * *